UNITED STATES PATENT OFFICE.

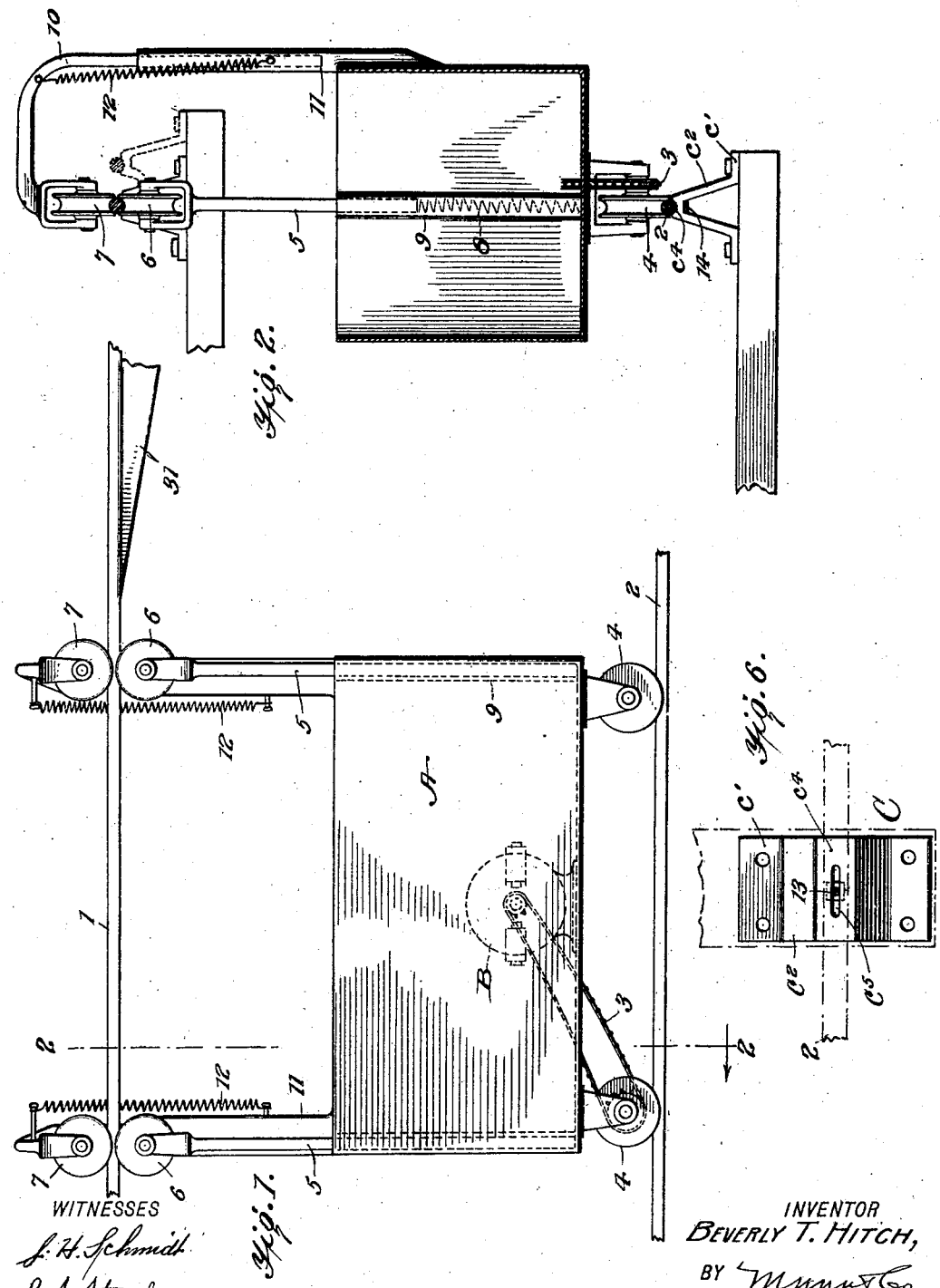

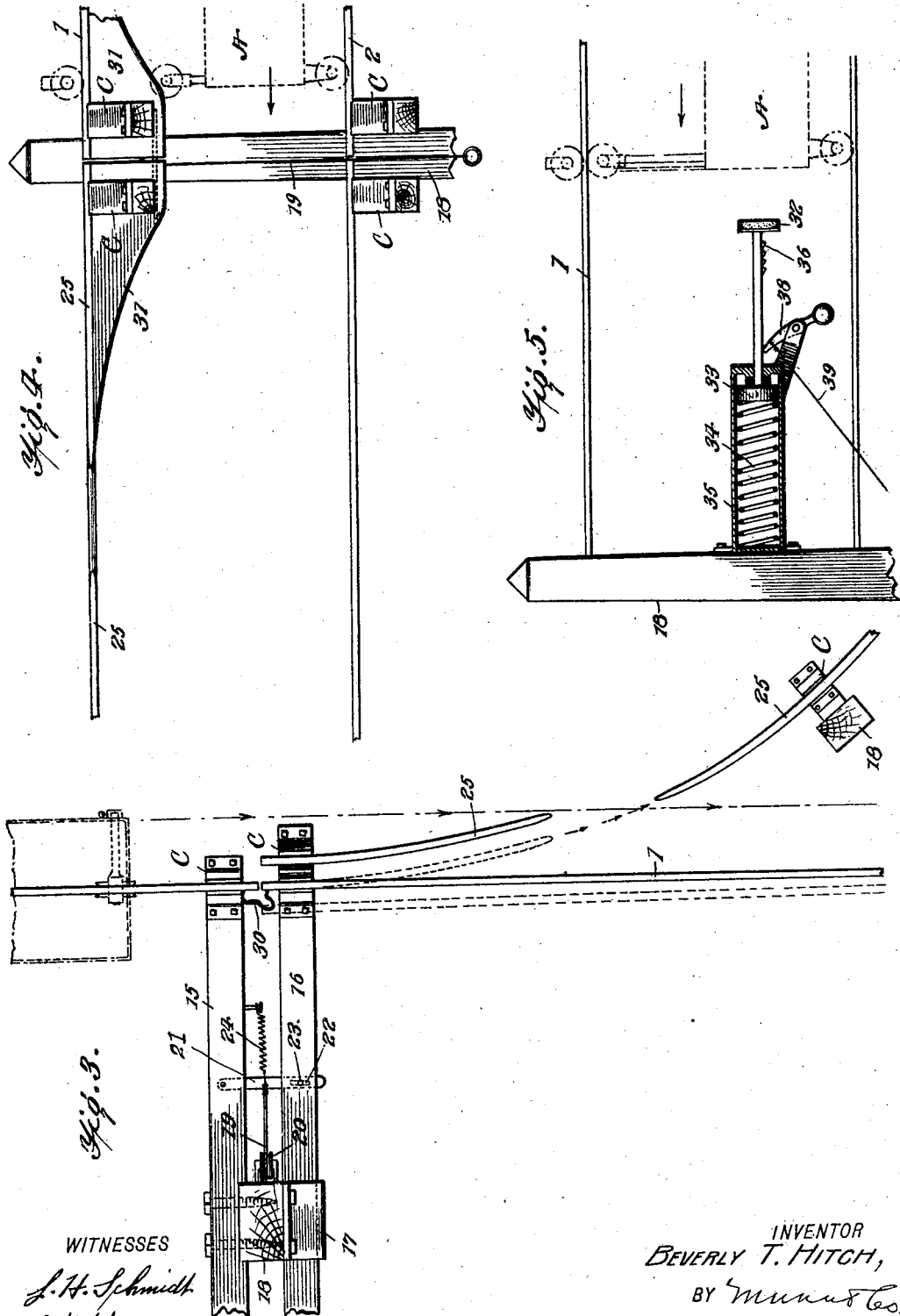

BEVERLY T. HITCH, OF ALLEN, MARYLAND.

TELPHER SYSTEM.

933,564.   Specification of Letters Patent.   Patented Sept. 7, 1909.

Application filed October 9, 1908. Serial No. 456,869.

*To all whom it may concern:*

Be it known that I, BEVERLY T. HITCH, a citizen of the United States, and a resident of Allen, in the county of Wicomico and State of Maryland, have made certain new and useful Improvements in Telpher Systems, of which the following is a specification.

My invention relates to telpher systems and is particularly applicable to rural mail delivering routes in which the delivering points are relatively far apart. It may be used also as a parcel delivering system or for any other purpose in which the rapid transportation of light matter is desirable.

An object of my invention is to provide a system in which the carriers when once placed on the track may be run rapidly, without danger of being thrown off. To carry out this object I have devised a special form of trolley as will be seen hereinafter.

A further object of my invention is to provide means for switching the cars or carriers on to sidings and to provide appropriate apparatus at the receiving and sending stations.

Other objects and advantages will appear in the following specification and will be particularly pointed out in the appended claims.

My invention is illustrated in the accompanying drawings in which—

Figure 1 is a side view of the car or carrier; Fig. 2 is a section of the same along the line 2—2 of Fig. 1; Fig. 3 is a plan view of the line, showing a switching means; Fig. 4 is a side view of a pole at a switching point; Fig. 5 is a side view of the receiving and sending station, and Fig. 6 is a detail plan view of an insulator for supporting the trolley wire.

Referring now to the drawings it will be seen that I contemplate the use of an upper wire 1 and a lower wire 2 for the track and current carrying members. All cars are supposed to run in one direction on one side of the poles and in the opposite direction on the other side, both sides being alike as to construction. The car A consists of a rectangular box or frame and is provided with a direct current motor B, connected by a sprocket chain 3 to the axle of one set of wheels 4. The motor is connected on one side through the upper trolley wheels 6 and 7 with the wire 1 and on the other to the wire 2 through the wheels 4. As long as the car is between the wires 1 and 2 the motor is actuated and the car is in motion.

At each end of the car is an upright telescopic standard 5 carrying a trolley wheel 6. This standard is controlled by a spring 8 in the cylindrical member 9, and is normally extended thereby. The trolley wheels 7 are carried on the bent arm 10, which is adapted to enter the hollow rod 11 being held therein by the spring 12. The provision of upper and lower trolley wheels 6 and 7 for the upper wire 1 is to prevent any possibility of the car jumping the wire.

The supports for the wires consist of any suitable insulating material preferably are made of glass or earthenware and are of the shape shown in Fig. 6. In this figure the insulator C comprises the base portion $c'$, the inclined portion $c^2$ and the top portion $c^3$. The latter is provided with a groove $c^4$ for the reception of the wire. A slot is provided in the top of the insulator and a pin 13 secured to the wire is arranged to slide in said slot to allow for expansion and contraction of the wire. The head 14 prevents the pin from leaving the slot.

In the upper part of Fig. 2 I have shown the double insulator used at the switching points. Referring now to Fig. 3 it will be seen that at these points I have broken the main wires and have made use of two cross arms 15 and 16. The arm 15 is stationary while the arm 16 is movable in guide members 17 on the pole 18. The movement of arm 16 is effected by means of a wire 19 passing over a pulley 20 and attached to a lever 21 which is pivoted to the stationary arm 15 and is provided with a slot 22 arranged to engage a pin 23 to move the arm. The spring 24 restores the arm when the wire is released.

It will be seen that by the means described the main wire 1 will be shifted to the position indicated by the dotted lines while the siding 25 is now brought in line with the approaching car. In order to let the car on the main line pass the upper wire 25 at a switching point the latter must be broken as indicated in the figure. The extended ends may be supported in any convenient manner or may consist of rods or rails bent as shown and attached to poles. The siding has no current and in order to keep the current flowing in the main line the flexible conductor 30 is used. To permit the car to pass a cross arm the inclines 31 are provided, which cause the trolley wheel 6 to ride underneath the arm and up to the wire 1 on the other side.

The sending and receiving station is shown in Fig. 5. When a car is switched off into a siding it strikes the buffer 32 driving the plunger 33 against the spring 34 in the cylinder 35. The spring takes up the motion and stops the car. In the meantime the teeth 36 on the rod 37 engage the weighted stop 38 which holds the plunger in its inward position. A pull on the wire or chain 39 serves to release the plunger which then springs forward under action of the spring.

The operation of the system will be readily understood from the description of the parts. When a car is to be started it is loaded with mail or other matter, the flexible member 39 is pulled and the car is propelled along the siding wire onto the main track when the motor gets current and propels it as already described. The cars may have distinctive features such as different colors, lights, flags or any suitable characteristics so that one can tell whether the car is intended for him or not. When a car is to be switched to a siding, the flexible member 19 is pulled thus throwing the siding wires in line with the main wires. When the car reaches the siding it is deflected thereon and runs to the end when it is stopped as described.

I am aware that other forms of the device based upon the same general idea might be made but I consider as my own and wish to claim all such modifications as clearly fall within the spirit and scope of the invention.

I claim:—

1. In a telpher system, a main line comprising upper and lower trolley wires, a siding, a movable cross arm constituting a switch member and a car having one trolley wheel adapted to run over said cross arm and another trolley wheel adapted to run under said arm.

2. In a telpher system, a main line comprising upper and lower trolley wires, a siding, a car arranged to be actuated by current through the main trolley wires and means for projecting said car from said siding onto said main line.

3. In a telpher system, a main line comprising upper and lower trolley wires, a siding, a car arranged to travel between the upper and lower wires of said main line, spring guiding means for said car, a movable cross arm having thereon terminals of said main line and said siding, a lever for moving said arm to bring said siding terminals in line with said main line terminals together with means on said siding for bringing a switched car to a gradual stop.

4. In a telpher system, a main line comprising upper and lower trolley wires, a car arranged to travel between the upper and lower wires of said main line, said car comprising a body, a telescopic arm secured at each end of said body, springs connecting the telescopic sections of said arms, wheels carried by said arms, telescopic standards carried by said body having wheels at their upper ends, the wheels on said arms and said telescopic standards being so arranged as to clasp the upper trolley wire.

BEVERLY T. HITCH.

Witnesses:
WILLIAM J. STATON,
A. H. MALONE.